H. B. NEWTON.
MOLD.
APPLICATION FILED DEC. 13, 1919.

1,431,027.

Patented Oct. 3, 1922.

Inventor,
Herbert B. Newton
by
[signature] atty

Patented Oct. 3, 1922.

1,431,027

UNITED STATES PATENT OFFICE.

HERBERT B. NEWTON, OF BROOKLINE, MASSACHUSETTS.

MOLD.

Application filed December 13, 1919. Serial No. 344,571.

*To all whom it may concern:*

Be it known that I, HERBERT B. NEWTON, a citizen of the United States, residing at Brookline, in the county of Norfolk and State of Massachusetts, have invented an Improvement in Molds, of which the following is a specification.

My present invention relates to a mold for building blocks having a plurality of block-forming units.

My invention has for its object to provide a mold of the type above set forth so constructed and arranged as to admit of convenient disassembling into its component members whereby said members may be thoroughly cleaned after each pouring and that admits of its being quickly reassembled; that has its component members formed with smooth or finished faces, thereby to impart to the molded block correspondingly smooth and finished faces; that has a common base on which all of the individual blocks of the mold are formed; and that is simple and inexpensive in construction.

The mold is particularly adapted to form the block set forth in my copending application filed December 13, 1919, Serial No. 344,572.

As here shown, the mold comprises the base-plate 10 on which all of the blocks are formed. The base-plate is preferably of iron or steel and is of suitable dimensions, preferably square or rectangular, to enable a plurality of blocks to be formed thereon at one pouring. Its top surface, or the surface on which the cement is poured, is made smooth and level thereby to impart to the blocks when hardened a smooth and highly finished face.

The mold also includes a plurality of side-plates 11 formed of rectangular strips preferably of iron or steel having smooth surfaces whereby to impart to the blocks similarly smooth surfaces. Each side-plate is adapted to have a width equal to the height of a block; and each strip is of such a length as to form the side plate for a plurality of blocks. The bottom edges of said plates are smooth and plane whereby they may be seated on the base plate 10 in such close contact therewith as to prevent leakage of cement from the molds. The top edges of the side-plates are also smooth and plane to admit the passage thereover of a scraper to remove surplus cement after pouring and to level off the mold.

Figure 1:
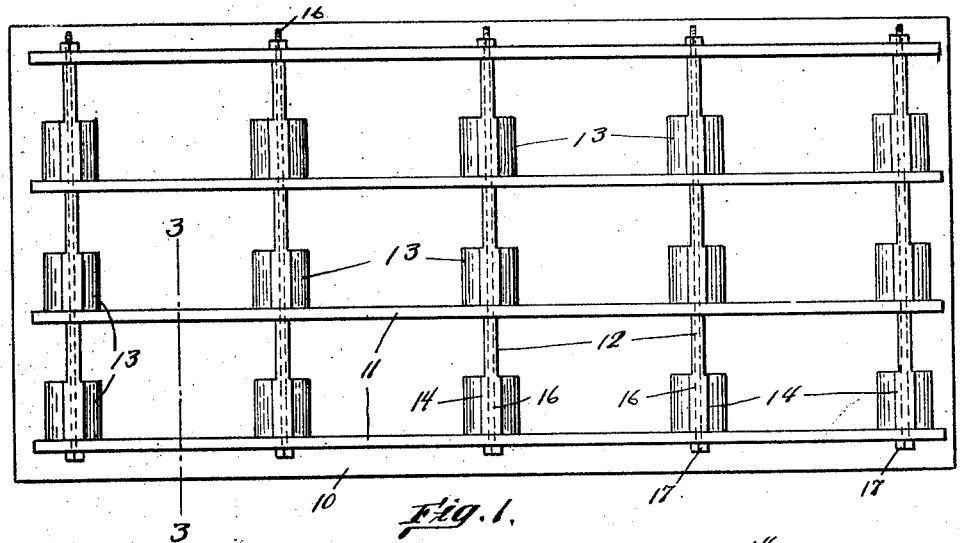
Fig. 1 is a plan view of a mold embodying my invention.
Figure 2:
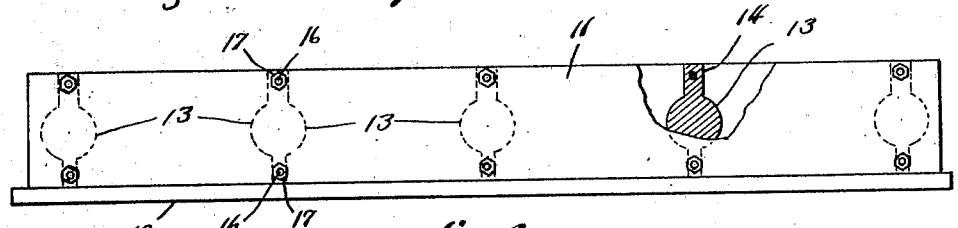
Fig. 2 is a side view of the mold of Fig. 1 with a side plate partially broken away to illustrate an end plate.
Figures 3, 4:
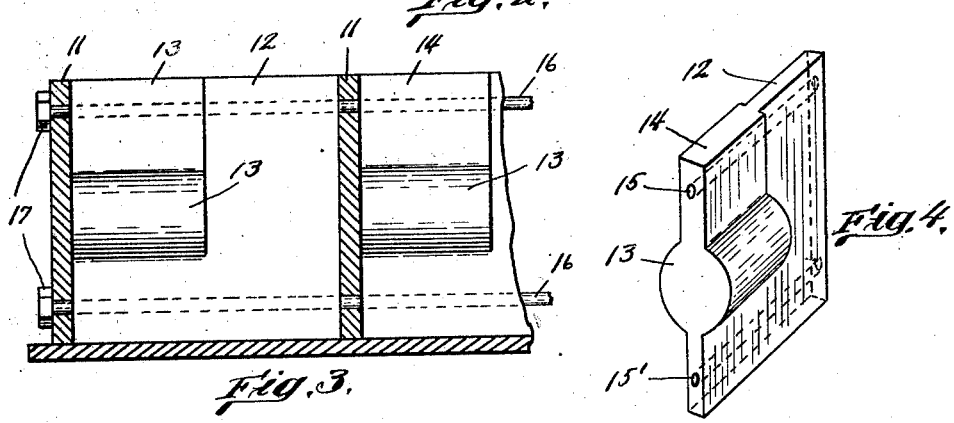
Fig. 3 is a partial transverse section of the mold along line 3—3 of Fig. 1.
Fig. 4 is a perspective view of an end plate.
Figure 5:
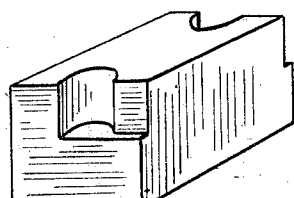
Fig. 5 is a perspective view of a block formed by the mold.

A plurality of end-plates 12, all of equal length, and of a height substantially equal to that of said side-plates, are disposed between said side-plates and serve to divide the mold into a series of compartments or units, each adapted to form a block when cement is poured therein and permitted to set. Said end-plates may be of any desired shape but, as here shown, the mold is adapted to form the block illustrated in Fig. 5; and for this purpose each end-plate has the substantially cylindrical boss 13 extending from the middle of one edge to substantially the center of the plate, and the rectangular enlarged portion 14 extending from said boss to the top edge of the plate.

Each end-plate has top and bottom holes 15 and 15' passing longitudinally therethrough and the side-plates have corresponding apertures therethrough. Tie-rods 16 are extended through said holes and apertures and nuts 17 threaded thereon serve to draw the inner side-plates and end-plates tightly together between the outermost side-plates, thereby securing said side and end-plates together into a unitary structure. Said structure, so formed, is received upon the base-plate 10 and the mold is in condition to receive the cement or other material of which the blocks are to be composed.

After the cement has set, the nuts 17 are loosened and removed, and the tie-rods are withdrawn from the side and end plates to permit the separation thereof, and the removal of the formed blocks. Due to the construction of the mold, every surface adapted to be in contact with the cement may have a smooth surface whereby to impart to the molded blocks a similarly smooth surface; and every component of the mold may be separated from its cooperating members for cleaning, and be quickly and easily re-assembled.

It is obvious that modified forms of the mold herein-described may be made without departing from the spirit of my invention.

I claim:—

1. A building block mold, comprising a base plate, forming one face of all molds, side plates arranged in spaced relation lengthwise said base plate, molding end plates slidably fitting between the side plates and resting on said base plate, and means passing longitudinally through aligned end plates and transversely through the side plates, whereby each series of aligned end plates are independently secured in place.

2. A building block mold, comprising a mold base common to all the molds, side plates arranged in spaced relation longitudinally of the base, end plates arranged in alignment transversely of the base and between the side plates, said end plates being free of interlocking connection with the side plates or base, and rods passed through each series of alignment end plates and side plates and secured beyond the latter, whereby any series of end plates may be independently removed at will without effecting the forming relation of other end plates.

In testimony whereof, I have signed my name to this specification.

HERBERT B. NEWTON.

Witness:
H. B. DAVIS.